Nov. 13, 1934.  W. G. BLAKE  1,980,902
STORAGE BATTERY RECEPTACLE
Filed June 6, 1932  2 Sheets-Sheet 1
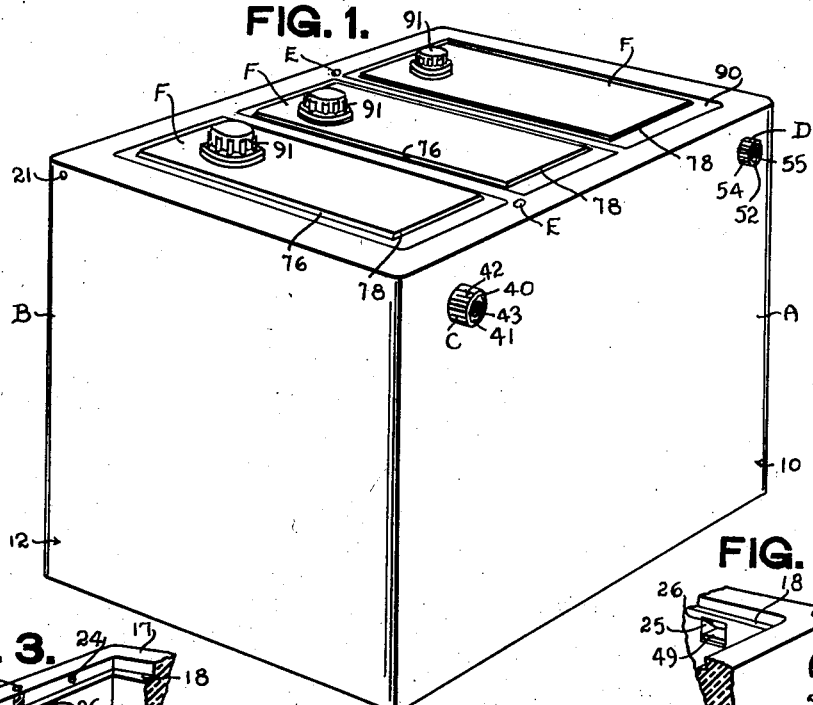
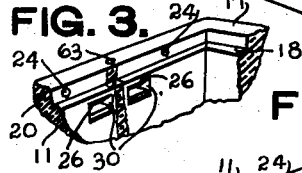
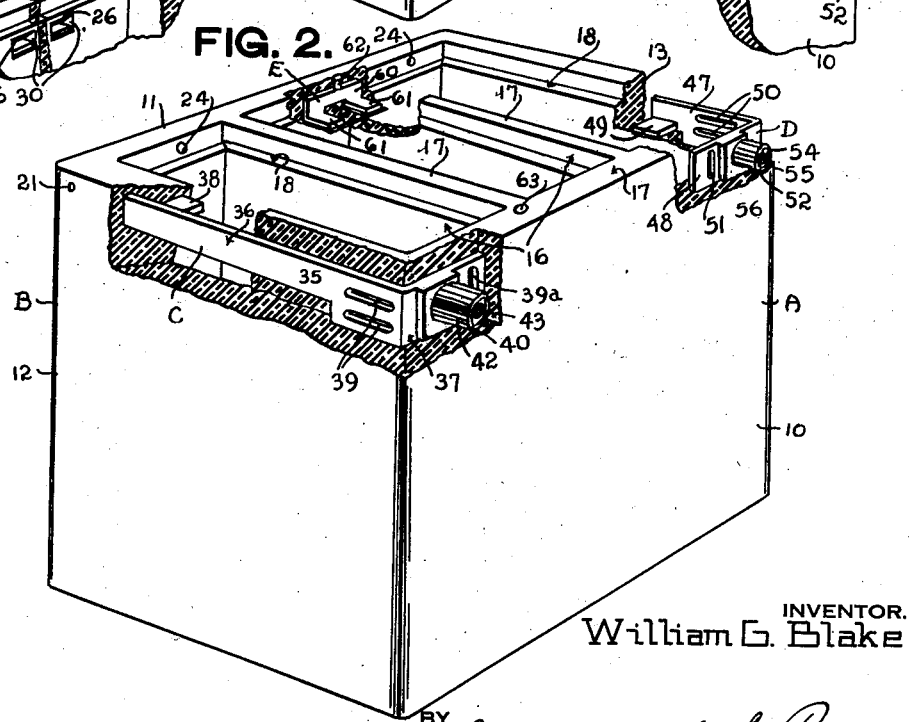
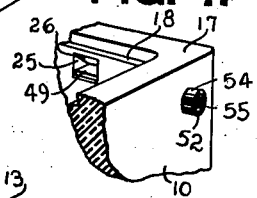
INVENTOR.
William G. Blake
BY
Lancaster, Allwine & Rommel
ATTORNEYS.

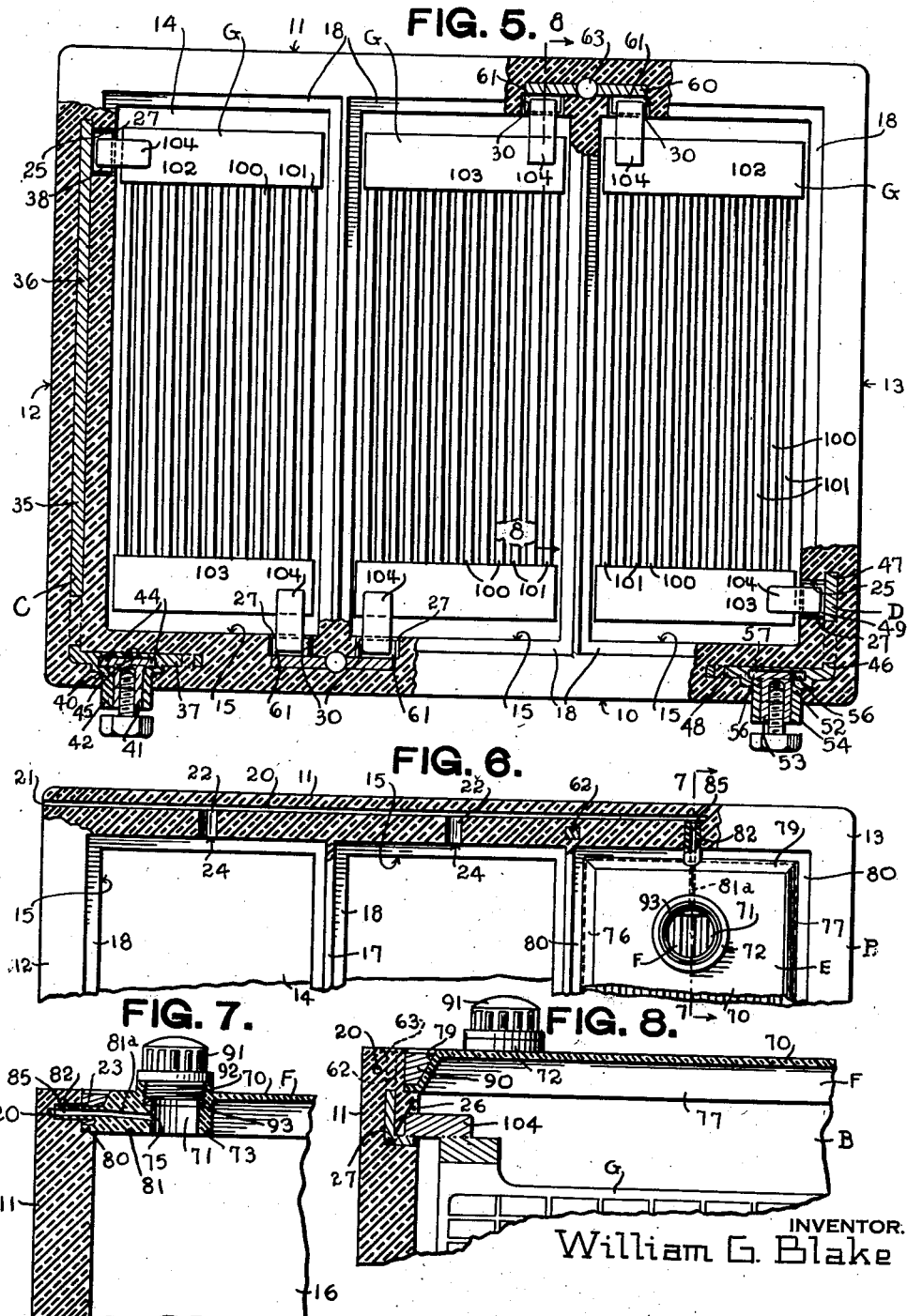

Patented Nov. 13, 1934

1,980,902

UNITED STATES PATENT OFFICE 1,980,902

STORAGE BATTERY RECEPTACLE

William G. Blake, Savannah, Ga.

Application June 6, 1932, Serial No. 615,743

3 Claims. (Cl. 136—135)

This invention relates to battery receptacles and more particularly to storage battery receptacle constructions.

The primary object of the invention is to provide a storage battery receptacle which is particularly strong in build and which will protect the plates within the receptacle from road shocks as well as from the rough treatment to which devices of this kind are sometimes subjected when being connected with or disconnected from battery cables, straps and the like.

Another object is to provide a novel storage battery receptacle in which the plates are in no way connected to or carried in part by the receptacle cover.

Another object is to provide a novel receptacle of this kind in which the terminal posts are far removed from the gas vent.

Still another object is to provide a storage battery receptacle provided with novel test terminals and cell connecting straps or busses.

Another object of the invention is to eliminate, for example, in a three cell storage battery, four of the six conventional projecting terminals and the two conventional elongate cell connectors as well as to eliminate the conventional vents in the three filler caps or plugs.

Another object is to provide a novel cover for a storage battery receptacle which, coupled with novel venting means in the battery receptacle, make provision for the venting of gas from the receptacle as well as for locking the cover to the receptacle.

Still another object is to provide a novel storage battery cover having no perforations such as those ordinarily provided for the projection of terminals therethru.

Other objects and advantages of the invention will be apparent during the course of the following detailed description, taken in connection with the accompanying drawings, forming a part of this specification, and in which drawings:—

Figure 1 is a perspective view of the novel storage battery receptacle.

Figure 2 is a similar perspective view with covers for the receptacle removed and parts broken away to better illustrate portions of the construction.

Figure 3 is a fragmentary perspective view of projecting portions of an element-connecting buss bar forming a part of the construction.

Figure 4 is a fragmentary perspective view of projecting portions of a terminal element forming a portion of the construction.

Figure 5 is a top plan view of a novel storage battery receptacle with conventional plate elements in place, parts of the receptacle being broken away to better illustrate portions of the construction.

Figure 6 is a fragmentary top plan view of the novel storage battery receptacle with a cover in place, and a portion of the receptacle broken away to better illustrate a novel venting means contained therein.

Figure 7 is a view substantially on the line 7—7 of Figure 6.

Figure 8 is a view substantially on the line 8—8 of Figure 5.

In the drawings, wherein for the purpose of illustration is shown only a preferred embodiment of the invention, the letter A may designate the improved storage battery receptacle including a vessel B, a pair of terminal elements C and D and a pair of element-connecting buss bars E, covers F for the receptacle A and a pair of elements of opposite polarities G.

The improved storage battery receptacle illustrated is one adapted to house three groups of elements G, but it should be understood that one group or any other odd number of groups may be housed as well. That illustrated is particularly adapted for use in motor vehicles and the like, but it should also be understood that the novel battery receptacle has a larger range of uses.

The vessel B is preferably elongate and includes vertical side walls 10 and 11 and vertical end walls 12 and 13 of substantial thickness, and a bottom wall 14. The interior of the vessel is preferably sub-divided into a plurality of compartments 15 by spaced apart vertical partition walls 16 extending laterally of the vessel. The upper ends 17 of each wall 10, 11, 12, 13 and 16 are flush and the compartment-facing surfaces of the several walls last mentioned are stepped adjacent their upper ends 17 forming a plurality of shoulders or ledges 18 as shown particularly in Figure 2. These several above named portions of the vessel B are integral and the vessel B is preferably of a mouldable composition of electrical energy insulating material such as rubber.

Preferably extending longitudinally thru a side wall of the receptacle A, such as the wall 11, and adjacent the upper end 17 of the wall, is a main way or conduit 20, shown particularly in Figure 6. The way 20 opens as at 21 exteriorly of the vessel and in the example shown opens or vents exteriorly of the end wall 12. It is preferred that the way extend thru the wall 11 and end at a point beyond the longitudinal medial line of the farthest removed compartment 15 from the exterior opening of the way 20. Extending laterally from this way 20 are a plurality of auxiliary ways 22, lying preferably on the longitudinal medial line of each compartment 15 and opening into the compartments above the shoulders 18. These auxiliary ways 22 are preferably larger in diameter than the way 20, for a reason later brought out in detail, and it is desirable that the uppermost portion 23 of the walls of the interior opening 24 of the ways 22 have a slightly greater arc than the general arc of the openings 24 for a purpose also later brought out in detail.

Preferably adjacent each of the corners formed by the walls 11 and 12 and the walls 10 and 13 and nearer their upper ends 17 is a recess 25 facing inwardly from each of the walls 12 and 13 and provided with a rear wall 26 which is beveled or sloped from the interior surface of the lateral or end walls 12 and 13 downwardly and away from the interior surface thereof. A horizontal ledge 27 forms the lowermost or bottom wall of the recess. In addition to these two recesses 25, are four other recesses 30, two adjoining ones in the longitudinal wall 11,—one being at either side of the partition wall 16, and two adjoining ones in the longitudinal wall 10,—one being on either side of the paralleling partition wall 16. The recesses 25 and 30 are substantially alike and located approximately the same distance from the upper end 17 of the walls and the same distance below the ledges 18, so that the showing in Figure 8 will illustrate in vertical cross section any one of these recesses. It will be noted from Figure 5 that the wall between the recess and the exterior of the vessel is quite thick and is reinforced by metal as will be subsequently described.

As for the terminal element C, the same preferably includes a comparatively thin terminal plate 35 of electrical energy conducting material such as lead, with the longer portion 36 and shorter portion 37 bent at right angles to each other. Adjacent the free end of the longer portion 36 is an inwardly horizontally extending lug 38 providing an internal terminal means for the terminal element. This longer portion 36 is also provided with preferably a pair of longitudinally extending anchoring slots 39. If desired, this portion 36 may be abbreviated in width as shown in Figure 2 in order to conserve metal. The shorter portion 37 of the plate 35 is provided with a vertical anchoring slot 39ª and spaced therefrom nearer the bend is an outwardly projecting cylindrical shell 40. Moulded into the portion 37 and surrounded by the shell 40 is a substantially cylindrical terminal post core 41 preferably of a metal harder such as brass, provided with a screw threaded socket 43 and having a pair of oppositely disposed lugs 44 near its inner end 45. The length of the terminal post core 41 is such that it will extend to the free end of the shell 40 as shown in Figure 5 and when the terminal element C is molded in the walls 10 and 12 of the vessel B as shown in Figure 5, the shell 40 and core 41 will project outside the vessel B from the wall 10 and adjacent an upper corner forming a terminal post 42. It can be seen that when the element C is molded into the vessel B, the lug 38 will lie flat on the ledge 27 of the recess 25 so that the lug is not forced to carry any weight without support below. As is evident, the anchoring slots 39 and 39ª are provided so that when the terminal element C is molded into the receptacle A, the material forming the receptacle A will enter the slot and aid in anchoring the element in the vessel. It can also be seen that due to the lugs 44, the terminal post core 41 is held against rotation, since the lugs are moulded into the portion 37.

Now as for the terminal element D, the same is very similar to the terminal element C, the differences being only minor ones. This element D includes a comparatively thin terminal plate 46 of electrical energy conducting material such as lead providing two portions 47 and 48 bent at right angles to each other. Adjacent the free end of the portion 47 is an inwardly and horizontally extending lug 49 providing an internal terminal means for the terminal element D. This portion 47 is also provided with preferably a pair of longitudinally extending anchoring slots 50. If desired this portion 47 may be abbreviated in width as shown in Figure 2 in order to conserve metal. The portion 48 of the plate 46 is provided with a vertical anchoring slot 51 and spaced therefrom nearer the bend is an outwardly projecting cylindrical shell 52. Moulded into the portion 48 and surrounded by the shell 52 is a substantially cylindrical terminal post core 53 preferably of a metal harder than lead as, for instance, brass, provided with a screw threaded socket 55 and having a pair of oppositely disposed lugs 56 near its inner end 57. The length of the terminal post core 53 is such that it will extend to the free end of the shell 52 as shown in Figure 5 and when the terminal element D is molded in the walls 10 and 13 of the vessel B as shown in Figure 5, the shell 52 and core 53 will project outside the vessel B from the wall 10, adjacent an upper corner, forming a terminal post 54 and substantially paralleling the other terminal post 42. Similar to the element C, it can be seen that the element D is molded into the vessel B, with the lug 49 lying flat on the ledge 27 of the recess 25 so that the lug is not forced to carry any weight unsupported below. From Figure 1, it will be seen that the way outlet shown at 21 is far removed from the exposed portions of the two terminal posts 42 and 54, with not only a top wall or cover but also nearly the whole length of an end wall between one terminal post and nearly the whole length of two walls between the other terminal post. It will also be seen that the terminal elements C and D provide reinforcing for the corners of the vessel adjacent the terminal post.

The element-connecting buss bars E each include a preferably flat elongate plate 60 of electrical energy conducting material such as lead and at or adjacent each end of the plate 60 is an inwardly and horizontally extending lug 61 providing an internal terminal means for each bar E. Extending upwardly from substantially the lateral medial line of the plate 60 is a lead 62 ending in a preferably disc-like test terminal 63. When the bar E is molded into the vessel B, the lugs 61 will lie flat on the ledges 27 of the recesses 30 so that these lugs like the lugs 38 are not forced to carry any weight unsupported from below. From Figure 5 it will be seen that the lugs 61 are on either side of their adjacent partition 16.

Taken as a whole, it can be readily seen from Figure 3 (which is typical for both the element-connecting buss bars E and their associated recesses) and from Figure 4 (which is typical for both the terminal elements C and D and their associated recesses) that of the several elements C, D and E, only the several lugs are exposed exteriorly of the wall of the vessel, the balance of the several elements with the exception of the terminal posts and the test terminals being molded into the vessel B, and it can also be seen from Figure 5 that there are no projections of the several elements mentioned extending inwardly beyond the interior surface of the several walls 10, 11, 12 and 13, which projections might seriously interfere with the assembling and use of the storage battery.

As for the covers F, these include a top wall 70 provided with a filler opening 71 having an exteriorly projecting boss 72 preferably interiorly screw threaded and also provided with a hollow depending boss 73. The interior wall of the boss 73 is perforated as at 75. The covers also have inclined side and end walls 76, 77, 78 and 79 which give the covers the conventional shape of such closures. The walls end in outwardly extending horizontal flanges 80 which rest upon the shoulders 18 of the vessel B as in an ordinary storage battery construction. A hollow enlargement 81 beneath the top wall 70 and connected to the end wall 79 communicates with the perforations 75 so that a passageway 81ª is provided with an intake at the opening of the perforations 75, which passageway 81ª may incline slightly upwardly from the intake and then extend horizontally thru the enlargement 81. From the exterior surface of preferably the wall 79 extends a substantially horizontal hollow stem or tube 82 having a circumference which will enable the tube to be inserted into one of the auxiliary ways 22. As heretofore brought out, the uppermost portion 23 of the wall of the opening 24 of the way 22 has a sligthly greater arc than the general arc of the opening 24 so that when placing the covers F upon the vessel B, the covers may approach the vessel at an angle which will enable the stem 82 to be inserted into the way 22 until the cover can be positioned with the flange 80 upon the shoulders 18 of the vessel B. Thus the cover will be locked or secured against lateral movement upon the vessel B, but may be removed by inserting a hooked finger, for instance, thru the perforations 75 and sliding the stem 82 out of the auxiliary way 22. The hollow or passageway 85 in the stem communicates with the passageway 81ª and provides an uninterrupted communication from the interior of the vessel B to the exterior thereof. Of course suitable sealing material 90 may be employed to seal the covers F to the vessel B as is common practice. The filler cap 91 is of conventional construction but of course no vent therein is required. The screw threaded shank 92 of the filler cap 91 engages the interior screw threads of the boss and is screwed down upon a preferably soft rubber gasket 93.

The pair of elements of opposite polarities G are conventional groups of spaced apart positive and negative plates 100 and 101 with each group suitably connected, as by burning, to conventional straps 102 and 103. Elongate leads or connector links 104 composed of electrical energy conducting material may be burned on the straps 102 and 103 and the several lugs as shown in Figures 5 and 8, thus connecting the several pairs of elements of opposite polarities in series and the latter also to the terminals 42 and 54.

From the above it can be seen that the cell covers do not carry any part of the weight of the elements G and that the two point attachment of each element G to the lugs prevents lateral and longitudinal shifting of the elements. The leads 104 may abut the reinforced walls of the recesses, thus aiding in preventing vibrations of the elements G and it is also apparent that the construction is such that these leads 104 may be burned on after the elements G are assembled. As heretofore brought out the lugs lie flat upon the horizontal walls of the recesses and thus cannot bend due to the weight of the several elements.

As for the novel covers F, it is seen that they have no openings for the projection therethru of terminals, etc., and that they provide means, coupled with the vessel itself, to vent gases arising from the electrolyte within the vessel, this venting taking place far from the terminals which are apt to be affected by the gases.

Various changes in details may be made to the form of invention herein shown and described, without departing from the spirit of the invention or the scope of the claims.

What is claimed is:

1. In a storage battery receptacle, a vessel of electrical energy insulating material provided with a pair of spaced apart recesses in the vertical walls thereof opening into the interior of said vessel, and a pair of spaced apart terminal elements molded into the vertical walls of said vessel provided with lugs projecting into and partly filling said recesses.

2. In a storage battery receptacle, a vessel of electrical energy insulating material provided with a pair of spaced apart recesses with their mouths opening into the interior of said vessel providing horizontal ledges and a pair of spaced terminal elements molded into the walls of said vessel, said terminal elements provided with lugs projecting into said recesses and resting upon said ledges each of said lugs having a height less than the height of the mouths of said recesses.

3. In a storage battery receptacle, a vessel of electrical energy insulating material provided with a pair of spaced apart recesses in the walls thereof having mouths opening into the interior of said vessel, said recesses providing horizontal ledges and each having at least one sloping wall extending downwardly and away from the interior of said vessel and from said mouths, and a pair of spaced apart terminal elements molded into the walls of said vessel, said terminal elements provided with lugs projecting into said recesses and resting upon said ledges and spaced from said sloping walls at the mouths of said recesses.

WILLIAM G. BLAKE.